United States Patent [19]

Benson et al.

[11] Patent Number: 4,556,329
[45] Date of Patent: Dec. 3, 1985

[54] RESISTOR TEMPERATURE DEVICE TRIP UNIT

[75] Inventors: Michael R. Benson; William D. Hill, both of San Jose, Calif.

[73] Assignee: General Electric Company, San Jose, Calif.

[21] Appl. No.: 446,032

[22] Filed: Dec. 1, 1982

[51] Int. Cl.[4] .......................... G01K 7/00; G21C 17/00
[52] U.S. Cl. ...................................... 374/173; 376/247
[58] Field of Search .................... 374/1, 128, 101, 147, 374/172, 173, 183; 376/247

[56] References Cited

U.S. PATENT DOCUMENTS

| | | | |
|---|---|---|---|
| 3,766,781 | 10/1973 | Roberts | 374/128 |
| 3,810,138 | 5/1974 | Thompson et al. | 376/247 |
| 3,848,466 | 11/1974 | Dial et al. | 376/247 |
| 3,880,006 | 4/1975 | Poduje | 374/173 |
| 3,892,281 | 7/1975 | Brown | 374/101 |
| 4,102,199 | 7/1978 | Tsipovras | 374/173 |
| 4,300,392 | 11/1981 | Bloomer et al. | 374/1 |

Primary Examiner—Salvatore Cangialosi
Attorney, Agent, or Firm—Ivor J. James, Jr.

[57] ABSTRACT

A resistor temperature device (RTD) trip unit is described. The RTD monitors thermal conditions at an industrial process location, such as in a nuclear reactor. Resistance of the RTD varies in accordance with temperature at the monitored process location. An amplifier circuit produces an output signal, corresponding to the variations in RTD resistance, which signal operates a plurality of relay circuits. The relay circuits variously report process conditions such as failure, the obtaining of a preselected level, etc. Additionally, metering provides a continuous analog indication of thermal conditions at the monitored process locations. To correct for non-linearity inherent in the RTD resistance slope, a recursive feedback path is coupled between the RTD amplifier stage and an RTD current source, such that a decreasing resistance slope produces a complementary increase in current supply to the RTD. The result is a linear output signal from the RTD amplifier.

18 Claims, 5 Drawing Figures

RESISTOR TEMPERATURE DEVICE TRIP UNIT

BACKGROUND OF THE INVENTION

1. Field of the Invention

The present invention relates to a device for monitoring the status of an industrial process. More particularly, the present invention relates to a resistor temperature device (RTD) trip apparatus for monitoring the thermal status of an industrial process, such as a nuclear reactor.

2. Description of the Prior Art

Industrial processes, such as the generation of electricity with a nuclear reactor, require monitoring of the various steps that define the process. Such monitoring is accomplished by including a sensor in proximity to the process step to be monitored. The sensor produces an electrical or mechanical signal that may be used to control the process or to indicate the status of the monitored process step.

In the example of a nuclear reactor, resistor temperature devices (RTDs) are often used to monitor thermal conditions at critical reactor locations. The RTD is typically an electrical device having a resistance value that varies in accordance with temperature. Variations in thermal conditions at various process locations are readily measured with an RTD.

The monitored thermal conditions are useful for many purposes. For example, a meter may be connected to the RTD to provide a continuous indication of temperature at the monitored process location. Amplifying and buffering circuitry may be added to the RTD to provide such temperature reporting at remote locations.

The RTD may be coupled to a trip circuit such that a signal output is produced when a preselected thermal condition is obtained. For example, a critical temperature may sound an alarm or may actuate process control devices. The RTD may also monitor thermal extremes at the monitored process location. In this way, a gross failure of the process, as indicated by excessively high or low temperatures, may actuate an alarm or initiate a system shutdown.

A disadvantage of the RTD (and other such sensors) is that as monitored conditions vary, the characteristic resistance value of the RTD varies in a non-linear fashion. As temperatures monitored by the RTD increase, the slope of the increasing RTD resistance decreases. Monitoring the resistance value of the RTD with an electronic circuit becomes quite difficult. A circuit set to sense a particular threshold level must include sophisticated and sensitive additional circuitry to be able to differentiate the various points on the RTD resistance curve.

An additional problem created by RTD non-linearity is that of operating a plurality of trip and monitor circuits from a single RTD. Each trip of metering circuit must incorporate additional complex circuitry to be able to interpret the varying slopes of the resistance curve produced by the RTD. In addition to adding expensive and delicate circuitry, the response time to changes at the RTD is significantly degraded. Most curve interpretations requires some sort of an integrator, such as a capacitor. Integration is a relatively slow process as compared to differentiation of a point on a curve having a constant slope. Integration requires incorporation of precision components, some of which require critical adjustments. This adjustment adds to the cost of manufacturing and reduces the reliability of the device, thereby necessitating increased maintenance.

In addition to providing more reliable, stable, and simple RTD operation, a trip unit based on a linear sensor input signal is more versatile. Offsets, calibrations, etc. may be easily incorporated into a linear circuit. Such options are much more difficult to include in a circuit providing a non-linear output signal.

SUMMARY OF THE INVENTION

The present invention solves the problems of non-linearity inherent in resistor temperature devices. By solving these problems the RTD may be used to produce a plurality of status signals, each of which has independent significance in an industrial process. By incorporating recursive feedback into an RTD current source, a reliable and versatile RTD trip circuit, elegant in its simplicity, is provided.

A resistor temperature device is coupled through a transient suppression network to an RTD amplifier. A feedback path is provided between the RTD amplifier and the RTD current source. The output of the RTD amplifier is buffered and is provided to a trip unit input buffer.

The output of the trip unit input buffer provides an output node or bus from which a plurality of relay devices may be operated. In the present embodiment of the invention, a gross fail detect circuit is included for sensing a catastrophic process condition, as monitored by the RTD. Provision is made for detecting a gross fail at both extremes of process operation. In the present invention an extremely high temperature or an extremely low temperature would signal a gross fail mode. A trip level detect is also provided to condition an output line in response to the occurrence of a preselected process status or condition. Visual indication is provided for both gross fail mode and trip detect; provision is also made for reversing trip detect operation.

Additional outputs provided include a buffered analog output signal that may be routed to a remote trip unit bus, and an auxiliary analog output signal that may be used to drive auxiliary metering devices or other such indicators. The exemplary embodiment of the invention includes a meter for monitoring thermal conditions at the industrial process associated with RTD.

The non-linear output of the RTD is maintained as a linear signal input to the RTD output buffer over a wide range of thermal conditions. To this end, the RTD amplifier output is summed with a current source reference current and a current source path detected current at a current source comparator. The summation of the three currents produces a control signal for a transistor that, in turn, controls current flow to the RTD.

In operation, as the slope of the RTD resistance value decreases, the current summation controlling the current supply to the RTD increases, providing an increasing current supply to the RTD. The result is a linearly increasing current output from the RTD amplifier over the entire range of RTD operation.

DETAILED DESCRIPTION OF THE PREFERRED EMBODIMENT

The present invention is a trip unit that produces a plurality of various output signals that are indicative of the environmental conditions present at a resistor temperature device (RTD). The invention finds application in the nuclear power industry where various operating temperatures are closely monitored for safe reactor operation at maximum efficiency. The invention may also find application in other industries requiring the reporting of thermal or other monitored process status conditions at a remote location.

Figure 1:
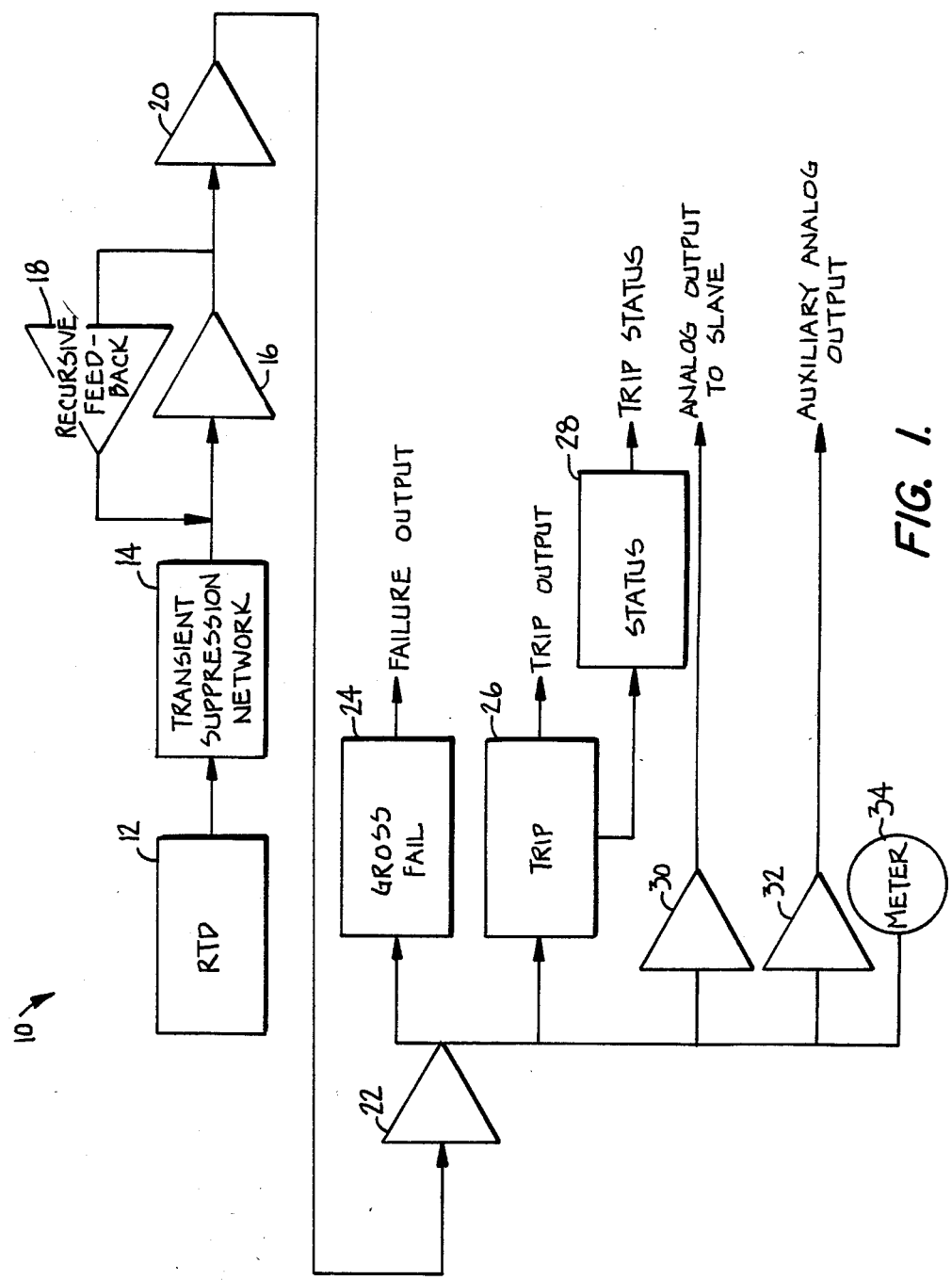
FIG. 1 is a block diagram of an RTD trip unit according to the present invention.

FIG. 1 is a simplified block diagram of the present invention showing the resistor temperature device trip unit 10 as a series of functional boxes. A resistor temperature device 12 is placed at a process thermal monitoring location. Resistor temperature device 12 may be any of such devices commonly available, such as the platinum resistance thermometers manufactured and marketed by Omega Engineering Inc. of Stamford, Conn. Typically, such devices are temperature sensing transducers which operate on the principal of change in electrical resistance of a platinum or other such wire as a function of temperature.

The varying resistance of the RTD over a fluctuating temperature range produces a signal that is routed through a transient suppression network 14 to an RTD amplifier 16. Because the resistance curve for most RTD devices is nonlinear, a recursive feedback circuit 18 is incorporated within the RTD trip unit to provide a linearly sloping analog signal, indicative of thermal conditions at a monitored process location, to an input of an RTD output buffer 20.

Buffer 20 output is routed to an input of a trip unit input buffer 22. The output of buffer 22 is provided to a plurality of status sense circuits as discussed below.

A gross fail detect circuit 24 is provided for indicating an upper and lower temperature limit at which a monitored process is said to have failed. Such failure may be attributed to component failure at the monitored process step or it may be symptomatic of failures within the process at other system locations.

A trip level detector circuit 26 is provided to indicate that a particular thermal condition has been sensed. Visual indication, as well as a status line, are provided by a trip status indicator 28. The present invention additionally provides an analog signal and reporting thermal conditions at the monitored process. An analog output buffer 30 is provided to route the analog signal to a slave trip unit or other such circuit. An auxiliary analog signal is also produced by an auxiliary analog output buffer 32, which signal may be used to drive auxiliary indicating equipment, such as a meter. The exemplary embodiment of the invention incorporates a meter 34 to provide an analog indication of the thermal condition sensed by RTD 12 at the monitored process location.

Figure 2:
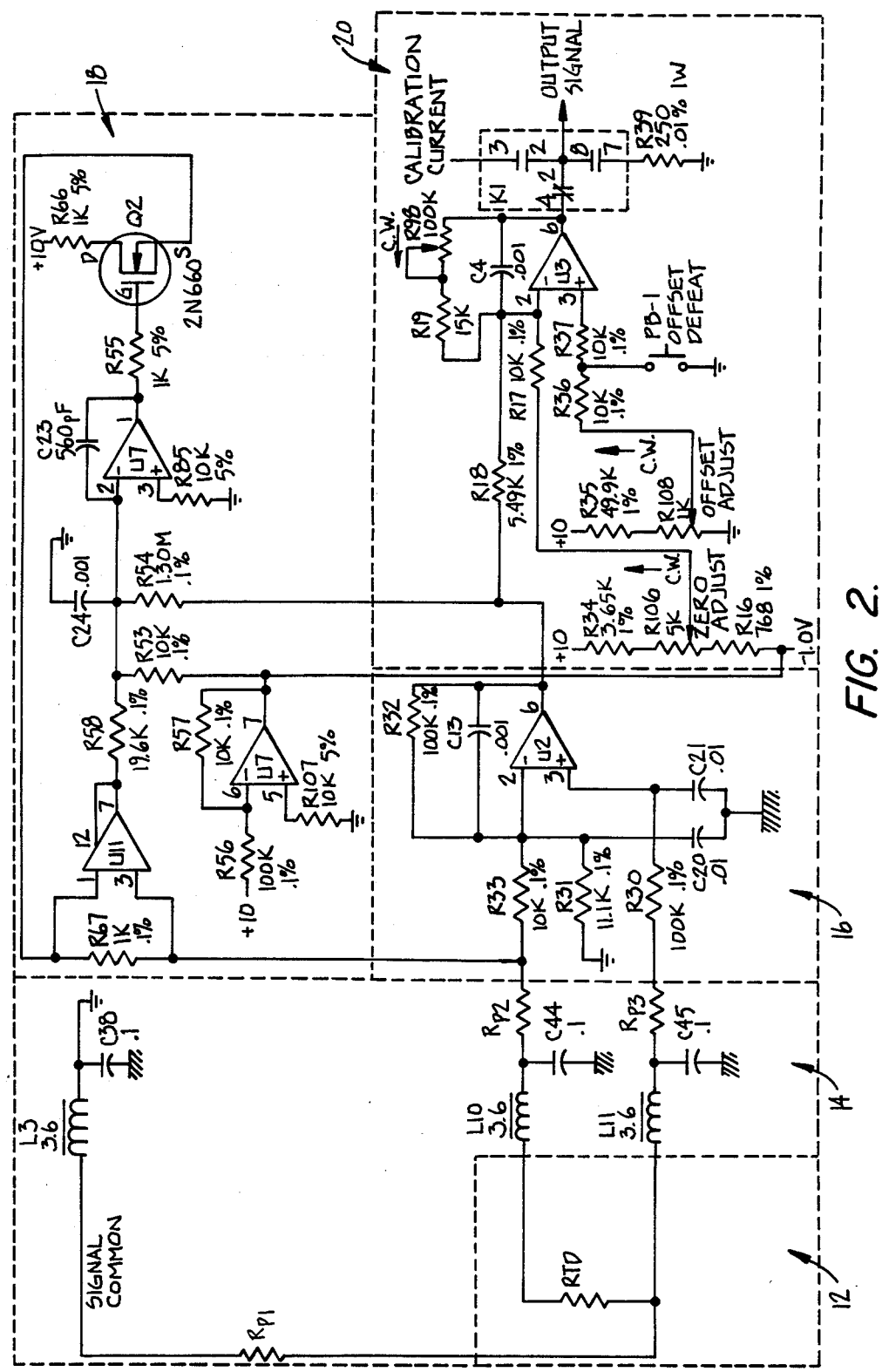
FIG. 2 is a schematic diagram of an RTD amplifier and output buffer, including a current source and a recursive feedback path, according to the present invention.

Referring now to FIG. 2, RTD 12 is shown as having three connections. A SIGNAL COMMON connection provides a ground return path through a transient suppression network comprised of inductor L3 and capacitor C8. A second RTD line routes a signal through a transient suppression network comprising inductor L11 and capacitor C45. This second line provides a reference path by which line loss and temperature variation along a transmission path between RTD 12 and RTD amplifiers 16 is compensated. A third RTD lead provides a signal path through a transient suppression network comprising inductor L10 and capacitor C44. The three signal paths provided from RTD 12 are indicated as having path resistance $R_{P1}$, $R_{P2}$, and $R_{P3}$. With this arrangement a transmission line loss or temperature variation between RTD 12 and the RTD amplifier may be readily compensated according to the formula:

$$V = i(R_{P1} + RTD + R_{P2}) - 2(iR_{P1})$$

where:
V = voltage drop across $R_{P1}/RTD/R_{P2}$; and
i = loop current for the loop comprising $R_{P1}/RTD/R_{P2}$.

RTD amplifier 16 includes an operational amplifier U2. Amplifier gain is determined by a feedback path comprised of a resistor R32 and a capacitor C13. A first RTD input to the RTD amplifier is provided at U2-3 as coupled through resistor R30. Noise and line interference are passed to ground by filter capacitor C21.

Because RTD 12 is a variable resistance device, a current source must be provided to bias the device for operation. Such a current source is provided by recursive feedback circuit 18 and is comprised of a current amplifier U7-1 coupled through a resistor R55 to a current switching transistor Q2. The drain (D) of transistor Q2 is coupled to a power source through a resistor R66. The source (S) of transistor Q2 is coupled through a resistor R67 to RTD 12 and also through a voltage divider comprised of resistors R31 and R33 to RTD amplifier U-2. A capacitor C20 provides a filter to remove noise present at RTD amplifier U2-2.

The current routed from transistor Q2 to RTD 12 produces a voltage drop across resistor R67. This voltage drop provides a driving voltage for instrumentation amplifier U11—a unity gain amplifier providing a 0–2 volt output corresponding to a 0–2 volt input. The output of instrumentation amplifier U11 is coupled through a resistor R58 to pin 2 of current source comparator U7-1. An additional current source is summed at pin 2 of current source comparator U7-1 as provided by reference buffer amplifier U7-7. The amount of current produced by reference buffer amplifier U7-7 is determined by resistors R56, R57, and input bias current compensation resistor 527. Capacitors C23/C24 provide a current source filter. Current source amplifier U7-1 produces an output reference voltage in accordance with the value of a resistor R85 coupled to its noninverting input.

Recursive feedback circuit 18 provides a current of continually increasing level to RTD 12 which compensates for the lack of linearity in the temperature-resistance curve of the RTD. Feedback path current is provided from RTD amplifier U2-6 through resistor R54 and is summed with the current provided by current source amplifier U7-7 and instrumentation amplifier U11-7.

As temperature sensed by the RTD increases, the resistance of the RTD increases. Such increase is initially linear, but becomes more and more gradual in slope as temperature increases. To compensate for the decreasing slope additional current is added to the RTD loop. To accomplish this the feedback current from RTD amplifier U2-6 produces an increasing current output from current amplifier U7-1. This increasing voltage on the gate (G) of transistor Q2 produces a greater current output from transistor Q2 which produces an increasing voltage drop across resistor R67. The increasing voltage drop across to resistor R67 produces a greater voltage output from instrumentation amplifier U11-7 which is summed at pin 2 of current amplifier U7-1 to produce an even greater output of current from transistor Q2.

In addition to the feedback within the recursive feedback circuit 18, the increased current produced by the recursive feedback circuit provides an increasing current to RTD 12 to compensate for decreasing current output at higher temperatures. This increasing current output is amplified by RTD amplifier U2-6 and provided through resistor R54 to current source amplifier U7-1 to provide an even greater current output from recursive feedback circuit 18. It is for this reason that the feedback circuit is said to be recursive. That is, an increasing output from RTD amplifier U2-6 produces a continually increasing output from recursive feedback circuit 18. The characteristics of recursive feedback circuit 18 are nonlinear such that they complement the nonlinearity of the RTD. In this way, an increasing current is added to that produced by the RTD and the result is a linear RTD output at RTD amplifier U2-6.

The output of RTD amplifier 16 (at RTD amplifier U2-6) is provided to RTD output circuit 20, which comprises a buffer amplifier U3-6. The RTD amplifier output signal is coupled to amplifier U3-6 through a resistor R18. The responsiveness of amplifier U3-6 to the RTD amplifier output signal is adjusted by potentiometer R98/resistor R19. Capacitor C4 is provided as a filter.

Whereas potentiometer R98 is provided to adjust the slope or steepness of the curve of the output signal, a potentiometer R106 is also provided to adjust a zero output signal level. A resistor R34 couples potentiometer R106 to a positive voltage source, and a resistor R16 couples R106 to a negative voltage source. Additionally, resistor R16 is coupled to the output of current source amplifier U7-7.

In addition to adjusting for curve slope and curve zero point, an off-set adjust is also provided by a potentiometer R108 and resistor R35. The off-set adjust voltage is coupled through resistors R36/R37 to buffer amplifier U3-6. The off-set voltage serves to raise or bias the starting point of the curve of the output signal above the zero point by a predetermined amount. A push button switch PB-1 is included to defeat the offset voltage during zero adjust or circuit calibration. Push button switch PB-1 is pressed when zero adjust calibration is performed. Push button switch PB-1 is then released and the offset voltage can be added as desired.

FIG. 2 includes three sets of relay contacts for a relay K-1. Normally-closed contact K1-2/4 couples the output of buffer amplifier U3-6 to trip unit input buffer 22. It may be desired to provide a calibration signal to the circuitry downstream of the RTD output buffer. To this end, relay K1 may be energized, thereby opening contacts K1-2/4 and closing contacts K1-2/3 and K1-7/8. When in the calibration mode, a voltage is dropped across a resistor R39 as developed from the calibration current source and is provided downstream for testing or calibration purposes.

Figures 3, 3A:
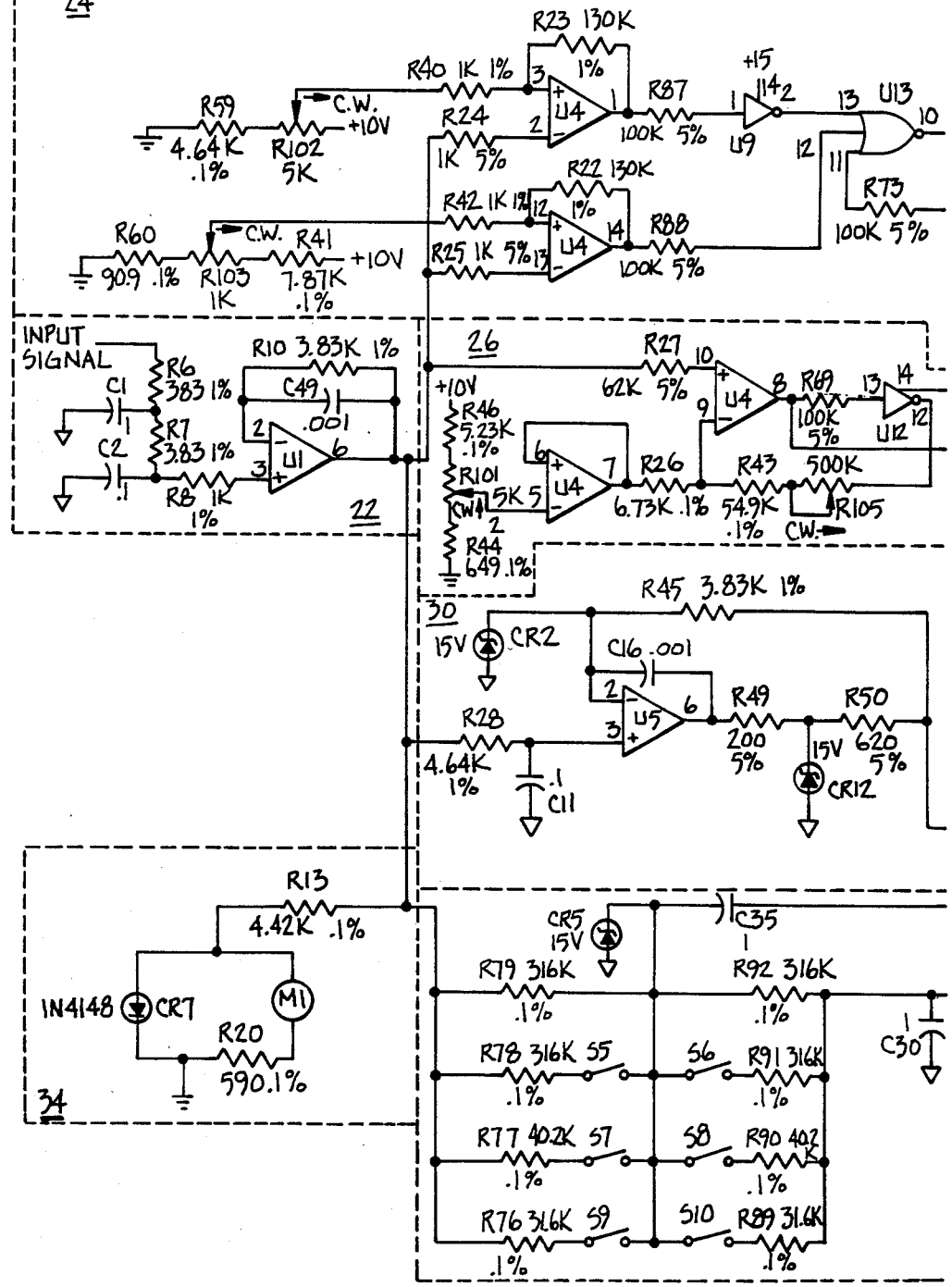
FIGS. 3, 3A and 3B are schematic diagrams of a trip unit according to the present invention.
Figure 3B:
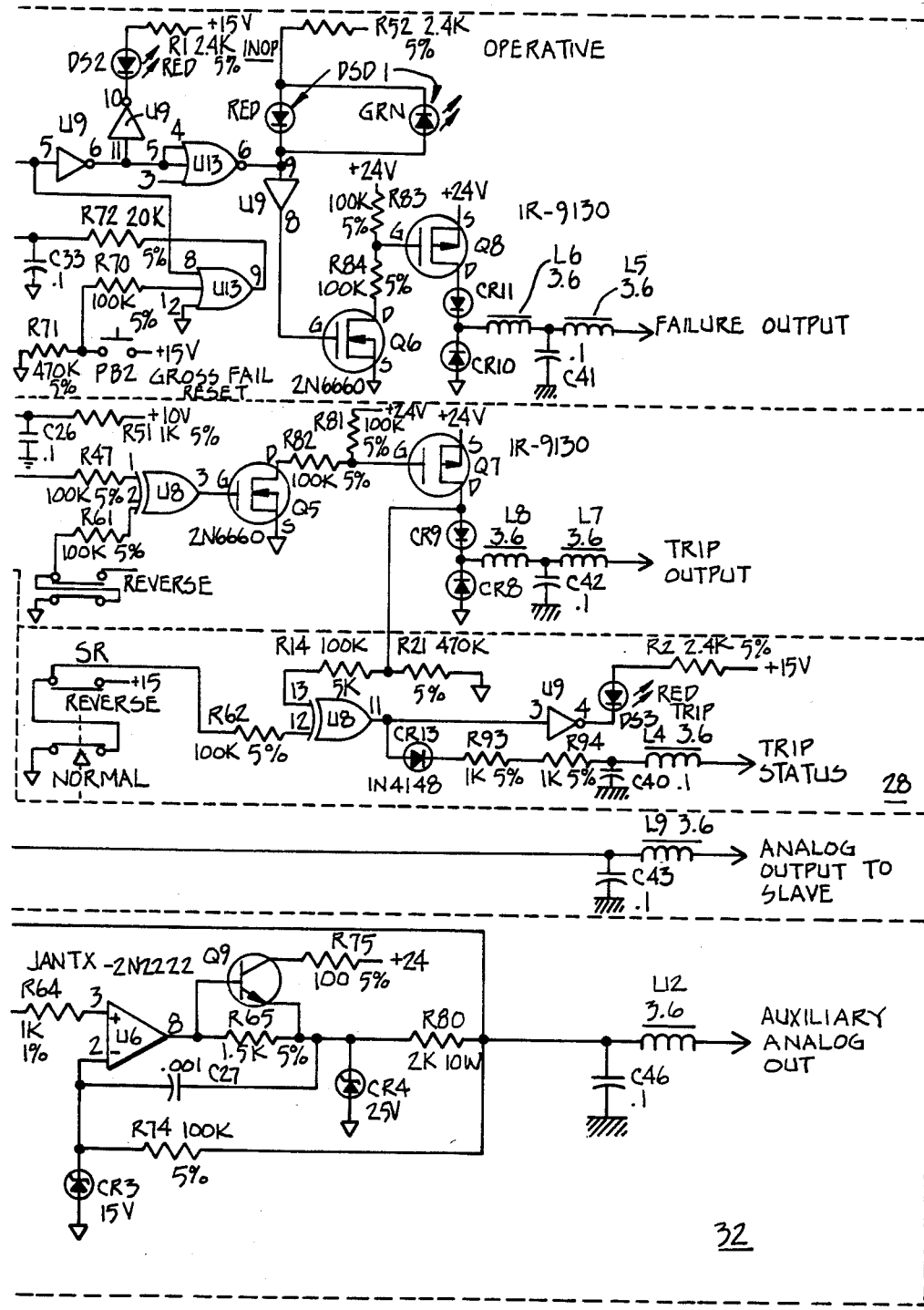

FIG. 3 is a schematic representation of a trip unit for use in conjunction with the amplified output of RTD 12, as provided by output buffer 20. The signal present at buffer U3-6 (FIG. 2) is coupled to trip level detect buffer 22, which comprises a two-pole input filter including resistors R6-R8 and capacitors C1/C2. The filter is connected to a buffer amplifier U1-6 that includes a feedback path established by a resistor R10 and a filter capacitor C49.

In the exemplary embodiment of the invention, the output of trip unit input buffer 22, as present at buffer amplifier U1-6, provides a node from which a control signal is routed along five different circuit relay paths for various monitored process status and condition reporting and processing (as shown in FIG. 1).

Referring back to FIG. 3, a first path is provided through gross fail detect circuit 24, which includes a gross fail-high path established by comparator U4-1 and a gross fail-low path provided by comparator U4-14.

The gross fail-high path comparator receives the buffered RTD signal through a resistor R24 at its inverting input. The noninverting input of comparator U4-1 includes resistors R40/R59 and potentiometers R102. Adjustment of potentiometer R102 determines the upper gross fail limit temperature as sensed by the RTD. For this reason a positive voltage source is coupled through potentiometer R102 and resistor R42 to the noninverting input of comparator U4-1. A resistor R23 determines the gain of the comparator. The output of comparator U4-1 is coupled through a resistor R87 and an inverter U9-2 to NOR gate U13-13.

The gross fail-low path receives the RTD signal through a resistor R25 at the inverting input of comparator U4-14. A low comparator reference level is provided to the noninverting input or comparator U4-14 through resistors R41, R42, and R60 and potentiometer R103. Adjustment of potentiometer R103 sets the gross fail-low detect level. Comparator U4-14 gain is determined by a resistor R22; the comparator output is coupled through a resistor R88 to NOR gate U13-12.

The presence of either a gross fail-high or a close fail-low signal at NOR gate U13-10 produces a signal that is routed through inverter U9-6 to a gross fail TRIP indicator, comprised of inverter U9-10, light emitting diode DS2, and a resistor R1. The signal is also routed to NOR gate U13-6. It should be noted that the gross fail high path is nearly identical to that of the gross fail low signal path, the main difference being the inclusion of the inverter U9-2 the gross fail high path, which inverter allows the gross fail high path to detect an upward temperature excursion above a preset limit.

Returning to NOR gate U13-6, it can be seen that the output of the NOR gate is provided to a pair of LEDs DS1 that have their terminals connected in opposite polarized directions through a resistor R52. Because of this configuration, one of the LEDs is always lit: the red LED is lit during an inoperative (INOP) condition (there has been a system gross fail); the green LED is lit during an OPERATIVE condition (there is no system gross fail).

The output of NOR gate U13-6 is also coupled through inverter U9-8 to a transistor switch U6. When the gate voltage of transistor U6 is sufficient, the transistor conducts, producing a voltage drop across resistors R83/R84. The voltage drop across these resistors supplies a voltage to the gate of transistor Q8, causing transistor Q8 to also conduct. In this way, the +24 volt supply is connected from the drain of transistor Q8, through a filter comprising inductors L5/L6 and capacitor C41, to a failure output circuit. Rectifiers CR10/CR11 are included to provide an inductive discharge path to ground (through rectifier CR10) when transistor Q8 is turned off. Rectifier CR11 prevents a current discharge through transistor Q8 to protect the device.

An additional feature of gross fail detect 24 is the inclusion of a GROSS FAIL RESET push button PB2. When a gross fail condition occurs, NOR gate U13-10, in conjunction with NOR gate U13-9, forms a latch that holds the failure output signal in a gross fail condition. Closing push button switch PB2 couples a voltage through a resistor R70 as dropped across a resistor R71. This voltage causes the latch circuit to toggle and the failure output signal returns to the quiescent or no fail mode.

Trip level detect circuit 26 provides another RTD output signal pathway. The RTD signal is coupled through a resistor R27 to a comparator U4-8. A current source is provided to the inverting input of comparator U4-8, as coupled from operational amplifier U4-7 through a resistor R26. Current level provided by operational amplifier U4-7 is a function of a voltage level determined by resistors R44/R46 and as adjusted by a potentiometer R101.

Comparator U4-8 is set to trigger at a level determined by a feedback path including resistors R43/R69 and a potentiometer R015. The feedback path also includes an inverter U12-12 having a power source coupled through a resistor R51 and a filter capacitor C26.

The output of comparator U4-8 is coupled through a resistor R47 to an exclusive OR gate U8-3. A switch S1 connects a second exclusive OR gate U8-3 input terminal to ground through a resistor R61. Switch S1 also may be set to a second position to connect said second exclusive OR gate terminal to a positive voltage. In this way operation of the trip level detect circuit may be reversed, and an upward or downward sloping temperature signal may be used to produce a trigger output.

The output of exclusive OR gate U8-3 is coupled to the gate of transistor Q5. The gate, when high, turns on transistor Q5, dropping a voltage through resistors R81/R82 and thus turning on transistor Q7. Transistor Q7 provides an output current to a filter comprising inductors L7/L8 and capacitor C42. Operation of rectifiers CR7/CR9 is similar to that of rectifiers CR10/CR11 discussed above.

A trip status circuit 28 is provided coupled to the drain of transistor Q7. A voltage drop across a resistor R21 and coupled through a resistor R14 to a first input of an exclusive OR gate U8-11 provides a status circuit signal. Operation of the exclusive OR gate may be reversed by coupling either a ground or a high condition through a resistor R62 to a second input of the exclusive OR gate. The reverse function is accomplished by operating a switch S2.

The output of exclusive OR gate U8-11 is coupled through an inverter U9-4 to an LED DS3, which indicates a TRIP condition. Additionally, an output of exclusive OR gate U8-11 is coupled through a rectifier CR13 and resistors R93/R94 to a filter, comprising inductor L4 and a capacitor C40. The filtered output signal provides for remote status reporting.

An additional RTD signal path provides an analog output buffer 30 circuit input signal. The RTD signal is coupled through a resistor R28 (filtered by a filter capacitor C11) to an operational amplifier U5-6. A feedback path is provided for operational amplifier U5-6 by resistors R45, R49, and R50; the feedback loop is filtered by a filter capacitor C16. Additionally, zener diodes CR2/CR12 protect the operational amplifier against voltage excursions above the 15-volt level.

The output from operational amplifier U5-6 is coupled through a filter comprising an inductor L9 and a capacitor C43, to a slave or other such circuit. The analog output may be used to operate a gross fail detect circuit, such as level detect circuit 26, or it may be used to operate other process status indicating circuits.

The RTD signal also drives a meter M1, which indicates actual process temperature sensed by the RTD. The RTD signal is coupled through a resistor R13 to meter M1, which is in series with a resistor R20. A rectifier CR7 included to provide meter protection in the event of an excessive meter input signal level.

The meter is included for local indication of sensed process temperature. For remote temperature indication, an auxiliary analog output circuit 32 is provided.

The RTD signal is coupled to an operational amplifier U6-8 through a resistor R64 and a filter circuit. The filter circuit provides a selectable R-C time constant and includes a capacitor C30 and resistors R76–79 and R89–92. The filter time constant is selected by switching resistors R76–78 and R89–R91 in and out, singly and in combination, by operating switches S5–S10.

Operational amplifier U6-8 drives a current amplifier transistor Q9 in accordance with the operational amplifier output developed voltage drop across a resistor R65. This produces a current flow through transistor Q9 and a resistor R75. The emitter of transistor Q9 is connected to a load resistor R80 and thence, through a feedback path including a resistor R74.

Capacitors C27/C35 are provided as filters; zener diodes CR3–CR5 are provided for circuit protection such that voltages exceeding the circuits safe operating level are dropped to ground.

The output of operational amplifier U6-8 and transistor Q9 is routed through a filter comprising an inductor L12 and a capacitor C46, to drive an auxiliary analog device or circuit.

A typical application of the present invention is in a nuclear power plant. The RTD is used to monitor thermal conditions about a critical reactor component. RTD resistance is a function of these thermal conditions. The characteristics of the RTD are such that the rate at which RTD resistance increases begins to decrease as the temperature about the monitored reactor component continues to increase.

The present invention provides a recursive feedback circuit such that heretofore unachievable precision in temperature measurements may be obtained. By adding a compensating current, the recursive feedback circuit provides a linear, upwardly sloping resistance value, which corresponds to increasing temperature at the monitored reactor component or process step.

Due to the linear nature of the RTD output signal that is produced, a plurality of status conditions may be reported, as discussed above. In this way, the confidence level achieved by thermal monitoring systems incorporating the present invention is much greater than has heretofore been achieved.

It will be appreciated that the present invention may be altered or produced in various embodiments without departing from the scope and spirit of the claimed subject matter. For example, the values shown in the schematic diagram of FIGS. 2 and 3 may be changed for different circuit applications or to allow for the inclusion of different active devices in place of those shown in the Figs. Additionally the invention may be produced without certain of the features shown therein. Additional stages of buffering may be added, etc. Therefore, the scope of the invention should be limited only by the breadth of the claims.

We claim:

1. A device for monitoring a parameter indicative of the status of a process comprising:
   a sensor, located proximate to said process, providing a sensor output signal corresponding to process status, said sensor having a characteristic nonlinearity in the range of said parameter;
   compensation means, coupled to said sensor, for compensating for said characteristic nonlinearity, said compensation means including an active recursive feedback network providing a bias signal to said sensor in response to said sensor output signal so as to provide a compensated sensor signal linearly related to said parameter; and
   means responsive to said compensated sensor signal providing at least one control signal for indicating process status.

2. The device of claim 1, wherein said compensation means further comprises an amplifier responsive to said sensor output signal and said bias signal, an output of said amplifier being coupled to said recursive feedback network to provide said compensated sensor signal.

3. The device of claim 2, wherein said means providing said at least one control signal comprises a plurality of relays, coupled to said amplifier, providing a plurality of control signals.

4. The device of claim 3, said relay means producing digital control signals.

5. The device of claim 3, said relay means producing analog control signals.

6. The device of claim 3, said relay means producing analog and digital control signals.

7. The device of claim 3, further comprising:
   means for producing an indication corresponding to process status.

8. The device of claim 7, said indication means comprising a meter.

9. A resistor temperature device (RTD) trip apparatus for monitoring thermal status of an industrial process, said apparatus including an RTD having a characteristic nonlinearity at a thermal extreme of said process, comprising:
   an RTD current source including active recursive feedback means for producing a constantly increasing current output complementary to said characteristic nonlinearity;
   output-signal generating means, having an input coupled to said RTD, for generating a linear output signal corresponding to the thermal status of said industrial process, said generating means being coupled to said feedback means;
   amplifying means, having an input coupled to said output-signal generating means, for amplifying said output signal; and
   a plurality of relay means, coupled to said amplifying means, for producing a control signal indicative of said thermal status in response to said linear output signal.

10. The apparatus of claim 9, said amplifying means further comprising:
    means for adding an offset signal to said linear output signal.

11. The apparatus of claim 9, further comprising:
    network means, coupled between said RTD and said generating means, for suppressing signal transients.

12. The apparatus of claim 9, said relay means further comprising:
    means for indicating process thermal extreme corresponding to process gross failure.

13. The apparatus of claim 9, said relay means further comprising:
    means for detecting a preselected process thermal condition, as indicated by said linear output signal, and for producing an indication thereof.

14. The apparatus of claim 9, said relay means further comprising:
    buffer means for producing an analog signal to operate a plurality of remote relay means.

15. The apparatus of claim 9, said relay means further comprising:
    means for generating an analog signal corresponding to said industrial process thermal status, in response to said linear output signal.

16. The apparatus of claim 9, further comprising:
    means for indicating industrial process thermal status.

17. The apparatus of claim 16, said indicating means further comprising:
    a meter.

18. In a resistor temperature device (RTD) trip apparatus for monitoring thermal status of an industrial process and including a plurality of relay means for producing a control signal indicative of said thermal status, an RTD current source including a recursive feedback path, comprising:
    a reference current amplifier providing a constant current output;
    a current comparator having an input coupled to said reference current amplifier output and producing a control signal in response thereto;
    a current source transistor having an input terminal connected to a current source, having a control terminal connected to said current source comparator output, and having an output terminal providing a controlled flow of current in response to said current comparator control signals;
    a path between said transistor output terminal and said RTD;
    an instrumentation amplifier having an input in said path and producing an output corresponding to current level in said path, coupled to the input of said current comparator;
    an RTD amplifier having a first input within said current path and coupled to a current input terminal of said RTD, having a second input coupled to a current return terminal of said RTD, and having an output providing a feedback signal coupled to the input of said current comparator and also providing a linear RTD output signal corresponding to monitored process thermal status.

* * * * *